Nov. 17, 1970  O. P. KEMPE ET AL  3,540,075
SAUSAGE LINKER
Filed Dec. 22, 1967  3 Sheets-Sheet 2
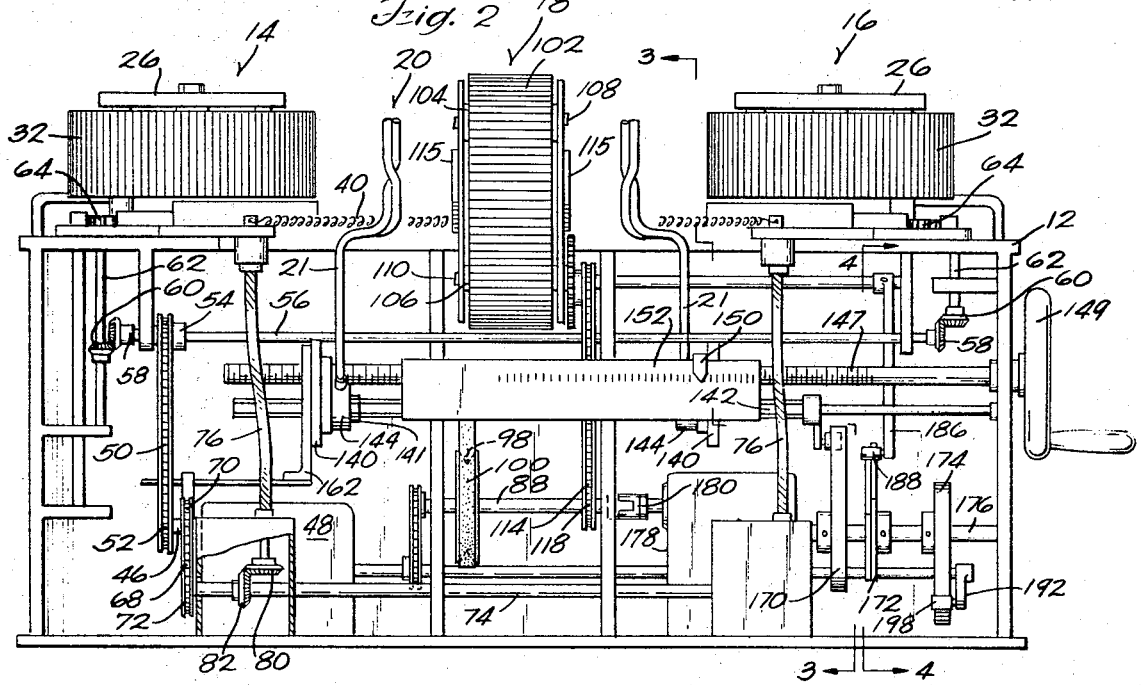
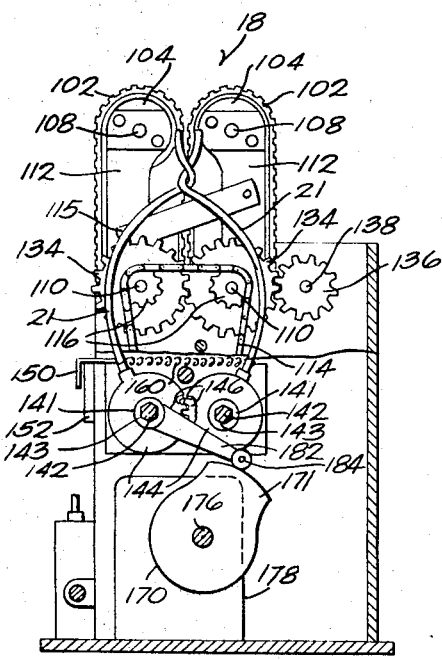
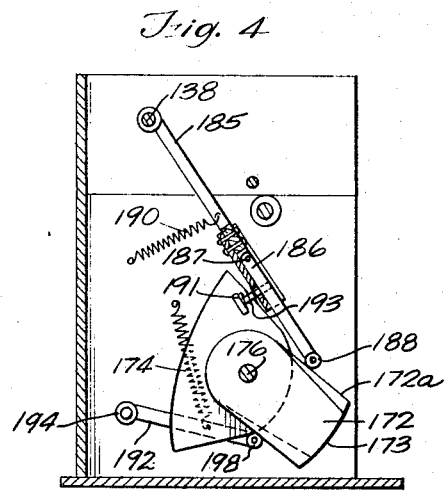
Inventors
Oscar P. Kempe
Raymond J. Menne
By
Wheeler, Wheeler, House & Clemency
Attorneys

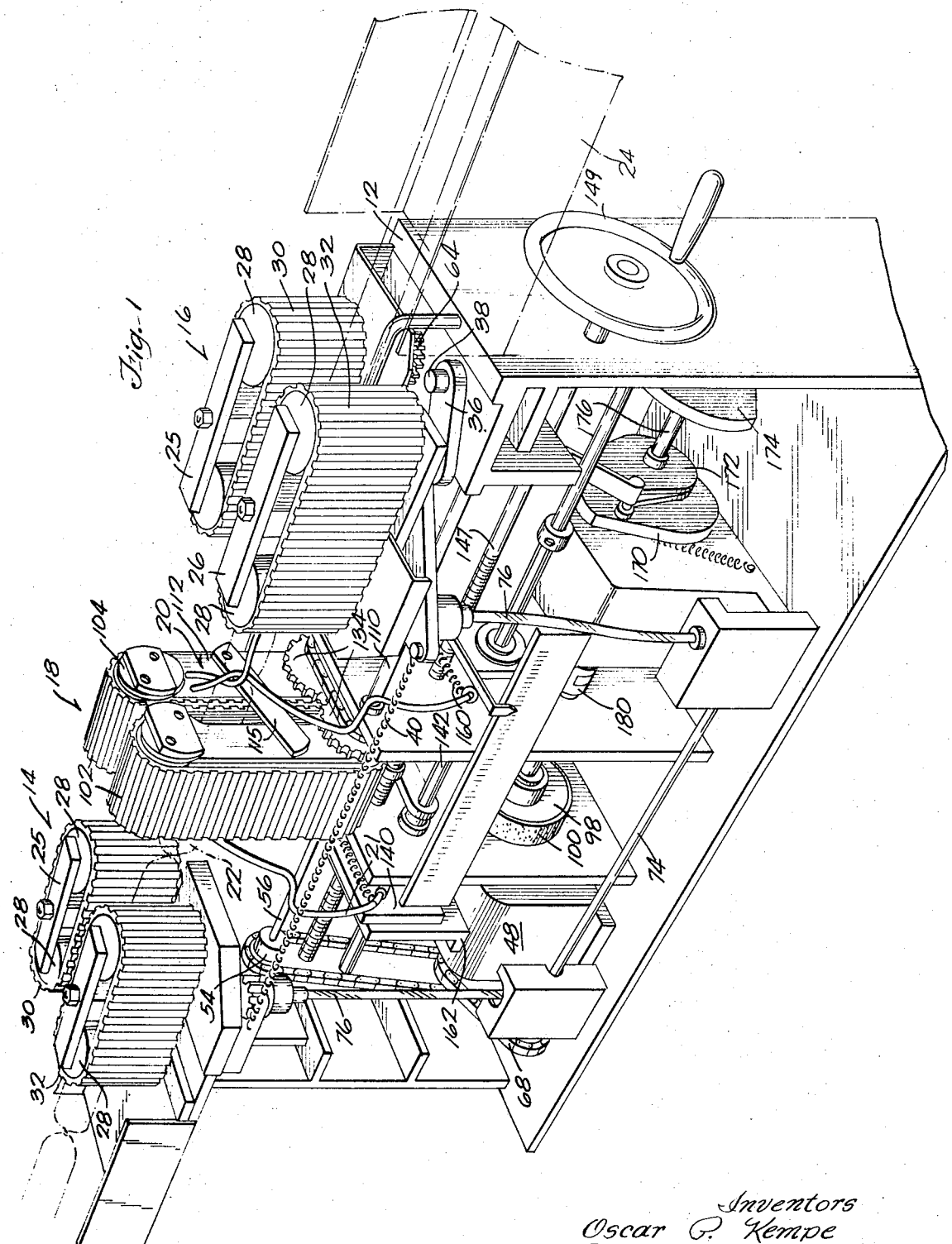

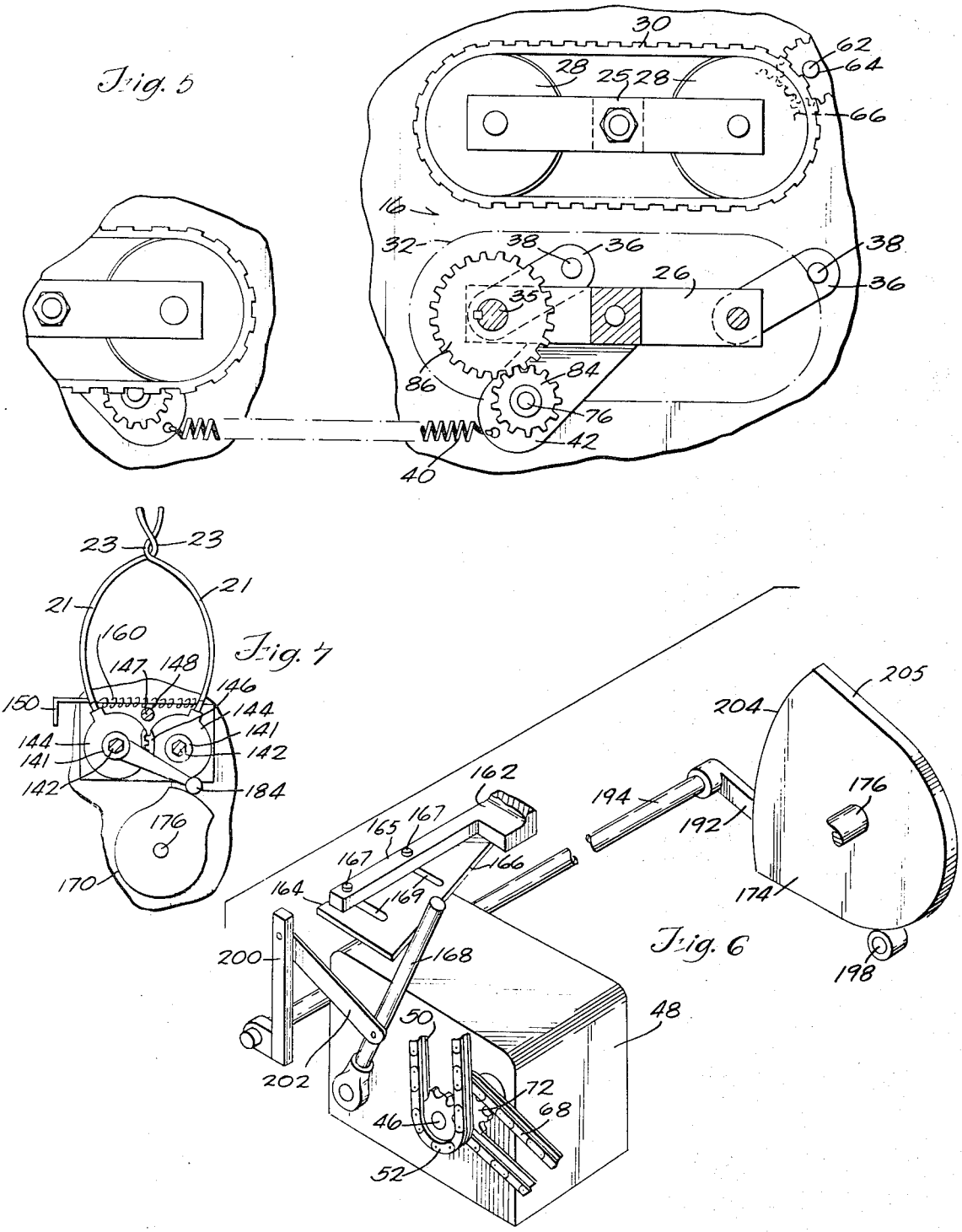

United States Patent Office 3,540,075
Patented Nov. 17, 1970

3,540,075
SAUSAGE LINKER
Oscar Paul Kempe, 204 S. Church St., and Raymond J. Menne, P.O. Box 712, both of East Troy, Wis. 53120
Filed Dec. 22, 1967, Ser. No. 692,875
Int. Cl. A22c 11/10
U.S. Cl. 17—34    9 Claims

ABSTRACT OF THE DISCLOSURE

Disclosed herein is a sausage twisting or linking machine having a pair of input feed belts and a pair of output feed belts operatively connected to be intermittently driven to feed a predetermined length of encased sausage through a pair of twist belts and a pair of crimping elements. The twist belts and crimping elements are movable into engagement with the encased sausage when the feed belts stop to twist the length of sausage crimped between the crimping elements. The length of the sausage link can be adjusted by changing the distance between the crimping elements and simultaneously adjusting the length of sausage fed to the machine by the feed belts.

BACKGROUND OF THE INVENTION

Sausages encased within natural casings are crimped by hand at a predetermined length and twisted to form the sausage link or tied with a string. The natural casings have non-uniform strength and must be handled gently or the casings will bust. Machines have been designed to twist and tie sausages encased in artificial casings but these machines cannot be used to twist a sausage encased within a natural casing because of the relatively poor strength of the natural casing.

SUMMARY OF THE INVENTION

The present invention relates to a sausage twisting machine which is capable of twisting sausages encased within a natural casing. This machine generally includes a pair of infeed belts and a pair of outfeed belts, a pair of twist belts operatively positioned between the infeed and outfeed belts and a crimping element on each side of the twist belts. The feed belts are intermittently driven from zero to a preset maximum speed and back to zero to gradually pull a predetermined length of sausage encased in a natural casing through the twist belts. The length of encased sausage fed through the twist belts each time the belts are driven is controlled by adjusting the maximum speed of the feed belts.

The crimping elements located on each side of the twist belts are closed when the feed belts stop to crimp the encased sausage to the length desired for the sausage link. The distance between the crimping elements can be adjusted to vary the length of the sausage link with a simultaneous adjustment of the maximum speed of the infeed and outfeed belts so that the length of encased sausage fed through the machine corresponds to the distance between the elements.

The twist belts are driven continuously and are closed when the encased sausage is crimped by the crimping elements to twist the length of encased sausage between the elements. The twist belts are held against the encased sausage long enough to produce approximately three and one half turns of twist in the sausage. The number of turns can be adjusted according to the required twist for the particular casing.

The amount of pressure applied to the sausage casing by the feed belts is minimized to reduce pressure on the casing by mounting one feed belt of each pair for movement toward and away from the other belt. A spring is used to bias the movable belt toward the other belt to automatically adjust the space between each pair of belts to the size of the encased sausage with sufficient pressure being applied only to move the encased sausage without slipping.

Other objects and advantages will become apparent from the following detailed description when read in connection with the accompanying drawings in which:

FIG. 1 is a perspective view of the machine for twisting sausage encased in a natural casing.

FIG. 2 is a front view of the machine.

FIG. 3 is a section view taken on line 3—3 of FIG. 2 showing the cam control for the crimping element.

FIG. 4 is a section view taken on line 4—4 of FIG. 2 showing the control for the twist belt assembly.

FIG. 5 is an enlarged section view of the outfeed belts for the machine.

FIG. 6 is a perspective view of the infinite speed control for the feed belts.

FIG. 7 is a view of one of the crimping elements and the drive cam arrangement.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2 of the drawings, the sausage linking machine generally includes a frame 12 having an infeed drive assembly 16 and an outfeed drive assembly 14 mounted on the top of the frame 12. A sausage twisting assembly 18 is mounted between the infeed and outfeed drive assemblies with a crimping element 20 positioned on each side of the twisting assembly. A sausage 22 encased by a natural casing is stored on a feed tray 24 and is pulled through the sausage twisting assembly 18 and the crimping elements 20 by the drive assemblies 14 and 16. The length of the encased sausage moved through the machine at any one time is controlled to feed two sausage lengths in each movement. When the infeed and outfeed drive assemblies are stopped, the crimping elements 20 will close to crimp the encased sausage 22 to the desired length and the sausage twisting assembly 18 will close to twist the crimped length of encased sausage. The twisting assembly and crimping elements will then open and the cycle will be repeated.

Each of the infeed and outfeed drive assemblies includes a pair of "I" type support brackets 25 and 26 with a pair of belt rollers 28 supported for rotary motion on each end of each of the support brackets. A flexible belt 30 is mounted on the rollers 28 on the back support brackets 25 and a flexible belt 32 is mounted on the rollers 28 on the front brackets 26. The back support brackets 25 are secured to the frame 12 in a fixed position. The front support brackets 26 are mounted for parallel movement relative to the back support brackets 25 to compensate for variations in the diameter of the sausage casing.

Referring to FIG. 5 a detail drawing is shown for the infeed drive assembly 16. The outfeed drive assembly is substantially the same except that the motion of the front support bracket 26 for the infeed drive assembly 14 is reversed. The front support bracket 26 has a pair of support links 36 pivotally connected to the shafts 35 for rollers 28 and pivotally mounted on pins 38 on the frame 12. A spring 40 is connected to a drive support arm 42 on the bracket 26 to bias the front support bracket 26 toward the back support bracket 25. The other end of the spring 40 is connected to a corresponding drive support arm 44 on the front support bracket 26 for the outfeed drive assembly 14. When the encased sausages enter the space between the belts 30 and 32 on the belt assemblies, the front support bracket will be free to swing outward on links 36 to compensate for variations in the diameter of the sausage casing with spring 40 providing sufficient bias to hold the belts together without breaking the sausage.

The infeed and outfeed drive assemblies are intermittently driven simultaneously to feed a predetermined length of sausage casing through the machine. Referring to FIGS. 1 and 2, the belts 30 on the back support brackets 25 are driven off of a drive shaft 46 on an infinite speed control or drive means 48 by a chain 50 mounted on a sprocket 52 on the drive shaft 46 and a sprocket 54 on a transfer shaft 56. The rotary motion of the transfer shaft 56 is transferred by bevel gears 58 on each end of the shaft 56 to a bevel gear 60 on a shaft 62 which has a drive gear 64 mounted for engagement with a driven gear 66 (FIG. 5) on one of the belt rollers 28.

The front bracket 26 is free to move in order to compensate for variations in the size of the encased sausage. A flexible drive means is therefore used to provide the driving motion for the belts 32 which are driven off of the drive shaft 46 of the infinite speed control 48 by a chain 68 mounted on a sprocket 70 on the drive shaft and a sprocket 72 on a second transfer shaft 74. Flexible shafts 76 are journalled in housings 78 and are driven by bevel gears 80 which are engaged by bevel gear 82 on shaft 74. The rotary motion of the flexible shafts 76 is imparted to the belts 32 by gears 84 (FIG. 5) on the upper end of the flexible shafts which engages gears 86 on the rollers 28.

In order to pull the encased sausage through the machine without breaking the casing, a drive means is used which will gradually speed up the infeed and outfeed drive assemblies 16 and 14 to gently pull the sausage through the machine at a gradual increase in speed to a predetermined maximum and then decrease the speed back to zero. This type of drive means is provided by the infinite speed control 48 which is a well known type of drive. The infinite speed control 48, as seen in FIG. 2, is driven off of a main drive shaft 88 by a chain 90 mounted on a sprocket 92 on the drive shaft 88 and a sprocket 94 mounted on an input drive shaft 96 to the infinite speed control 48. A motor (not shown) is connected by a V-belt 98 on a sheave 100 to drive the shaft 88. The infinite speed control 48 is cam controlled as described below to drive the infeed and outfeed drive assemblies simultaneously from zero to a preset maximum speed to pull the sausage casing gently through the belts.

The twist belt assembly 18 includes a pair of flexible belts 102 mounted on rollers 104 and 106 which are mounted shafts 108 and 110, respectively, on side plates 112. The upper rollers 104 are mounted for free rotation on shaft 108 and the bottom rollers 106 are keyed to shafts 110. The shafts 110 are driven by a chain 114 mounted on sprockets 116 and a sprocket 118 on the main drive shaft 88. The side plates 112 are pivoted about the axis of shafts 110 to open and close the belts 102 by means of interengaged gears 134 secured to the plates 112 in axial alignment with shafts 110 and a gear 136 mounted on a shaft 138 with the gear 136 engaged with one of the gears 134. The cam control for periodically oscillating shaft 138 to open and close the belts 102 is described below. A cross bar 115 is secured to one of the side plates 112 for each of the belts 102 and extends across the space between the belts to support the encased sausage on each side of the assembly. The cross bars 115 prevent the sausage from sagging between the crimping elements. The side plates 112 are cut out at 111 (FIG. 3) to provide sufficient clearance for the flexible belts 102 to flex or bend to adjust to the diameter of the encased sausage. The twist belts 102, as well as the drive belts 30 and 32, are molded from food grade rubber with V protrusions on the back to fit in V pulleys on each end of the roller and ladder type protrusions on the front for traction.

The crimping elements 20 on each side of the twist belt assembly 18 are closed to crimp the sausage on each side of the twist belt assembly prior to twisting the sausage and are opened after the sausage has been twisted but prior to the movement of the sausage. The distance between the elements 20 can be adjusted to vary the length of the sausage link made by the machine. Referring to FIGS. 2 and 7, the crimping elements 20 shown each include a pair of clamping wires 21 each of which is secured to a circular plate 144 that is mounted on a cylindrical tube 141. The tubes 141 have a hexagonal opening 143 and are mounted for axial motion on hexagonal shafts 142. The tubes 141 are also rotatably mounted on a support plate 140 with a gear segment 146 on each circular plate 144 in engagement so that any rotary motion of one plate will produce an equal but opposite motion in the other plate. Each of the crimping wires is bent at 23 to form one half of a one eighth inch circle and on closing the clamp wires a one-eighth inch opening will be formed.

The crimping elements 20 are moved axially on shafts 142 by an adjustment means in the form of a reverse threaded screw 147 that is screwed through holes 148 in the support plates 140. Rotation of the handle 149 on the end of screw 147 will produce equal but opposite motion in each of the plates 140 on shafts 142. A pointer 150 is secured to one of the support plates 140 for movement relative to an indicator 152 to indicate the distance between the crimping elements 20.

The support plate 140 on the left in FIG. 2 is also used to control the maximum speed of the infinite speed control 48 to coordinate the distance between the crimping elements 20 with the amount of encased sausage fed to the machine. An L bracket 162 is secured to the face of support plate 140 and extends downward to a position overlying the control means 48. A flat cam plate 164, FIG. 6, is secured to a support arm 165 on the lower end of the L bracket 162 by two adjusting screws 167 that extend into slots 169 in the cam plate. A diagonal cam surface 166 is provided along one edge of the cam plate 164 and extends horizontally outward from the end of the L bracket 162. A control arm 168 on the infinite speed control extends upward past the cam plate and will engage the cam surface 166.

Since the cam surface 166 will move with the crimping elements 20, the amount of travel of the control arm 168 will be changed each time the element 20 is changed. The maximum speed imparted to the drive assemblies which determines the amount of encased sausage delivered to the machine will depend on the amount of travel of the control arm 168. The infinite speed control 48 is capable of providing from zero to 400 r.p.m. to the drive shaft 46. In FIG. 6 the control arm is moved counterclockwise from zero to maximum speed. The engagement of the control arm with the cam surface 166 will determine the maximum speed provided by the control means 48. It should be apparent that the left end of the cam plate 164 is used for the shorter sausage links and the right end for the longer sausage links. The movements of the control arm are controlled by a cam 174 as described below.

The cam control means for the infeed and outfeed drive assemblies, the sausage twisting assembly and the crimping element consists of a set of cams 170, 172 and 174 secured to a cam shaft 176 that is driven off of a reduction gear 178. The reduction gear 178 is connected to the main drive shaft 88 by a coupling 180 and on each complete revolution of the cam shaft 176, a complete cycle of operations will be completed, that is, a length of sausage will be fed through the machine. The crimping elements 20 will close to crimp the sausage, the twist belt assembly will close to twist the sausage between the clamps, the twist belt assembly and crimping elements 20 will open and the cycle will repeat.

Referring to FIG. 7, the operation of the control cam 170 for the crimping elements 20 is shown. A lever arm 182 having a cam follower 184 is mounted on one of the hexagonal shafts 142 and is biased by a spring 160 between the clamp wires 21 so that the cam follower follows the surface of the cam 170. Each time the cam follower 184 rides up on lobe 171, the crimp wires will be closed to crimp the sausage and will stay closed until the cam follower rolls off of the lobe 171.

Referring to FIG. 4 the twist belt cam 172 which is used to open and close the twist belt assembly is shown. Two bars 185 and 186 are pivotally connected by pin 187 to form a lever arm having one end secured to shaft 138 and a cam follower 188 secured to the other end. A spring 190 is used to bias the lever arm toward the cam 172 with a cam follower 188 riding on the surface of the cam 172. A second spring 191 mounted on a bolt 193 on the end of bar 185 acts against bar 186 to hold the lever arm in a substantially straight line and also provides an override in the event the twist belts cannot close. A similar override may be provided for the crimping clamps. Cam 172 is a double cam having an identical back cam 172a that is movable to increase or decrease the length of lobe 173. The length of lobe 173 will determine the length of time that the twist belts are closed which also determines the number of twists or revolutions of the sausage casing. Three and one half revolutions is customarily used.

The drive (FIG. 6) for the infeed and outfeed drive assemblies is controlled by means of a cam 174 which is positioned to engage a cam follower 198 on a lever arm 192. The lever arm 192 is secured to one end of a shaft 194 journalled in frame 12. An L-shaped arm 200 on the other end of shaft 194 is connected by a connecting link 202 to the control arm 168 of the infinite speed control 48. When the cam follower 198 is riding on the cam surface or lobe 204 on the cam 174, the control arm 168 will be held in the off or zero speed position. As the cam follower rolls off of the lobe 204 and follows the cam surface 205, the control arm 168 engages cam surface 166 on cam plate 164. When the control arm 168 stops, the cam follower 198 will also stop and will remain in that position until the cam 174 moves far enough for the cam surface 205 to re-engage the cam follower 198 and rotate the control arm 168 back to zero.

The infinite speed control is set to drive the infeed and outfeed drive assemblies long enough to feed two sausage links through the machine each time. Referring to FIG. 2 the encased sausage is fed from right to left. If the crimping elements are spaced six inches apart, twelve inches of encased sausage will be fed into the machine each time the drive assemblies are operated.

What is claimed is:

1. A sausage twisting machine to automatically twist a sausage encased in a natural casing, said machine comprising
    a sausage infeed drive assembly,
    a sausage outfeed drive assembly,
    drive means for driving said infeed drive assembly and said outfeed drive assembly simultaneously from zero to a predetermined maximum and back to zero,
    a twist belt assembly positioned between said infeed drive assembly and said outfeed drive assembly,
    said twist belt assembly being movable from an open to a closed position,
    crimping elements on each side of said twist belt assembly being movable from an open to a closed position,
    said drive means including means for adjusting the maximum speed of said infeed drive assembly and said outfeed drive assembly in accordance with the distance between said crimping elements,
    and control means for intermittently actuating said drive means and closing and opening said twist belt assembly and said crimping elements.

2. A sausage twisting machine according to claim 1 wherein each of said drive assemblies includes
    a pair of flat flexible belts, one of which is biased for movement toward and away from the other belt.

3. A sausage twisting machine according to claim 2 including
    a spring connected to said one of said belts in each of said assemblies to bias said one of said belts toward the other of said belts.

4. A sausage twisting machine according to claim 1 wherein said crimping elements each include
    a support plate mounted for movement toward and away from each other,
    and an adjusting means operatively connected to each of said support plates to adjust the distance between the crimping elements.

5. A sausage twisting machine according to claim 1 wherein said speed adjusting means includes
    a cam plate mounted on one of said crimping elements to vary the maximum speed of the drive means according to the distance between the crimping elements.

6. A sausage twisting machine for automatically twisting a sausage encased in a natural casing, said machine comprising
    a frame,
    an infeed assembly and an outfeed assembly mounted on said frame,
    drive means for driving said assemblies simultaneously from zero to a maximum speed and back to zero,
    a twist belt assembly mounted on said frame between said infeed and outfeed assemblies,
    said twist belt assembly being movable from an open to a closed position,
    a crimping element located on each side of said twist belt,
    said elements being mounted for movement toward and away from each other and movable from an open to a closed position,
    adjustment means for varying the distance between said crimping elements and including means for automatically adjusting the maximum speed of said drive means on movement of said elements toward and away from each other,
    and control means for actuating said drive means in a step by step manner, and for intermittently closing said crimping elements and said twist belt assembly each time said drive means stops.

7. A sausage twisting machine according to claim 6 wherein said automatic adjusting means includes
    a cam to vary the maximum speed of the drive means according to the length of sausage to be twisted.

8. A sausage twisting machine according to claim 6 wherein each of said infeed and outfeed assemblies includes
    a flexible belt that is movable in a parallel direction to the path of motion of a sausage being fed through the machine and is biased for movement to a parallel position with respect to the encased sausage.

9. A sausage twisting machine according to claim 6 including means for varying the length of time said twist belt assembly is closed.

References Cited

UNITED STATES PATENTS

| | | | |
|---|---|---|---|
| 1,966,552 | 7/1934 | Jacobson | 17—34 |
| 3,054,545 | 9/1962 | Karius. | |
| 3,209,397 | 10/1965 | Biderman | 17—34 |

LUCIE H. LAUDENSLAGER, Primary Examiner